Feb. 13, 1968
J. J. POERINK
3,368,662
TRANSPORT DEVICE WITH CONVEYOR BELT GUIDED
RECTILINEAR AND CURVILINEAR
Filed Nov. 1, 1966
3 Sheets-Sheet 1
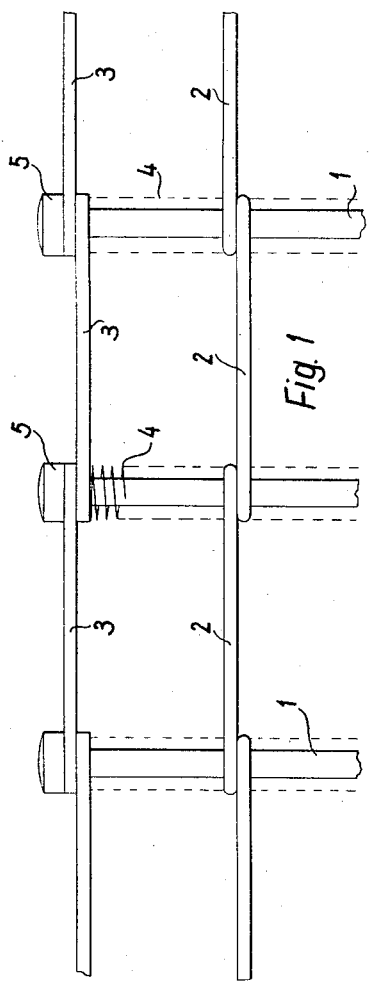
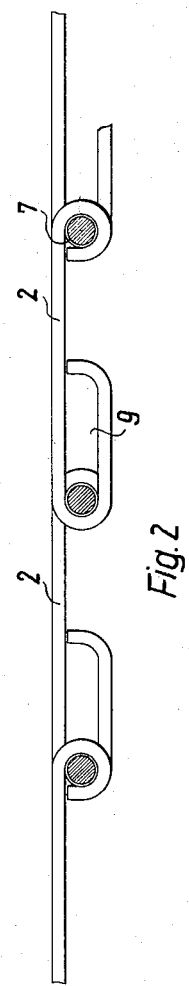
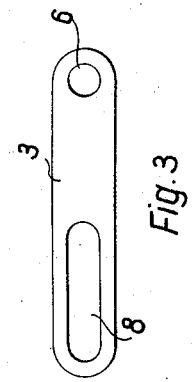
Inventor:
Jannes Jonge Poerink
By William C. Collard

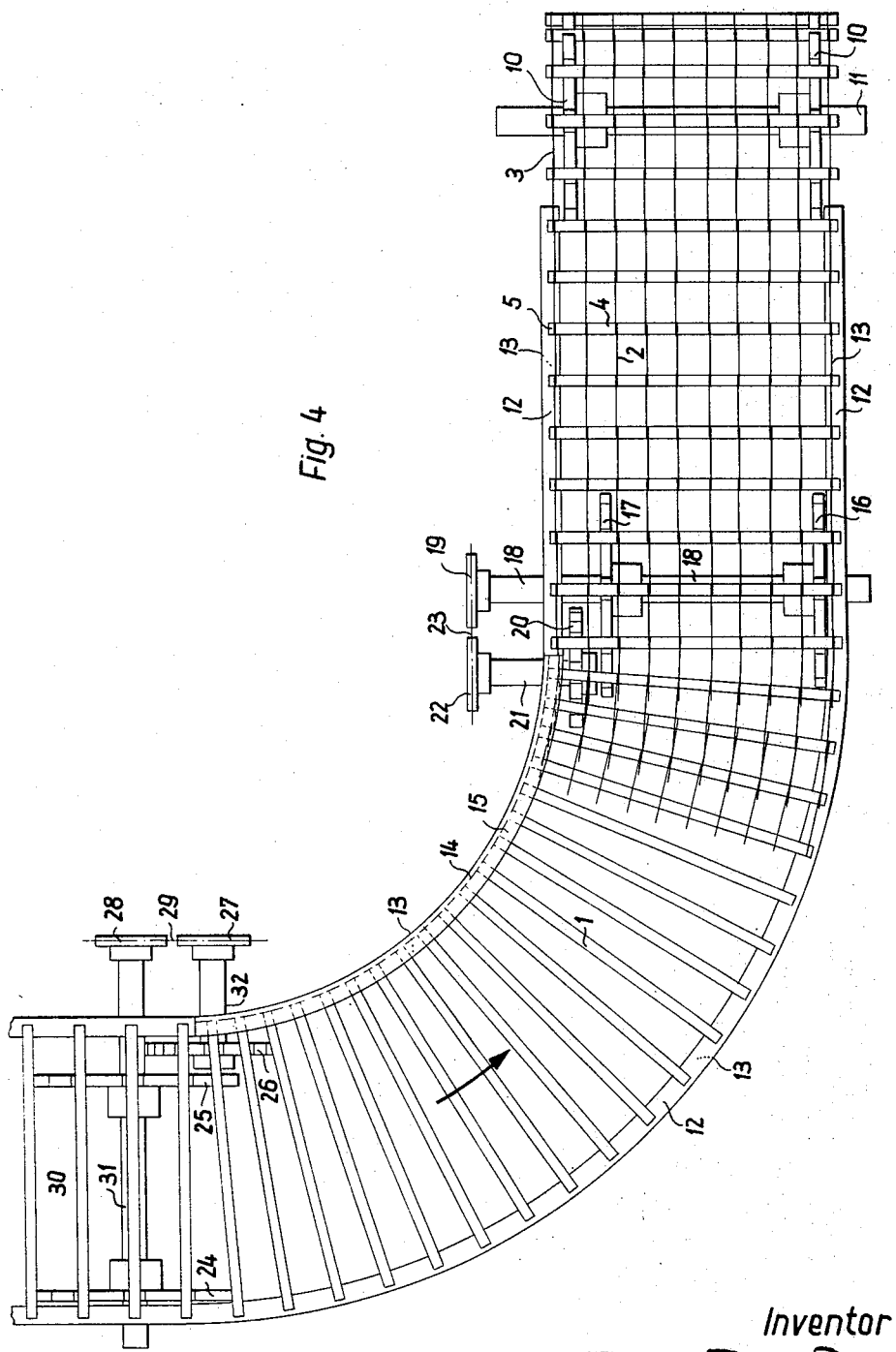

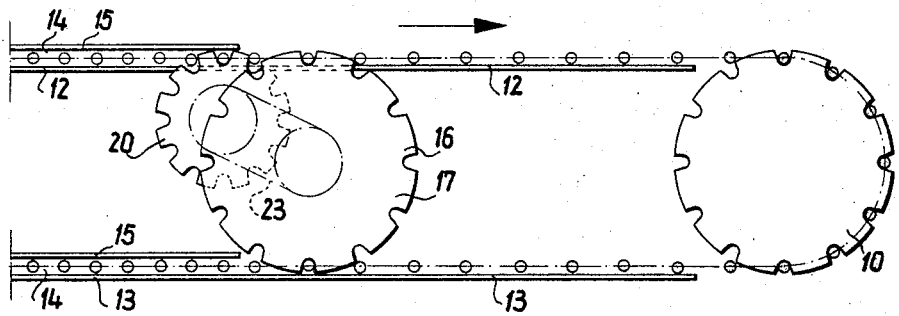
Fig. 5
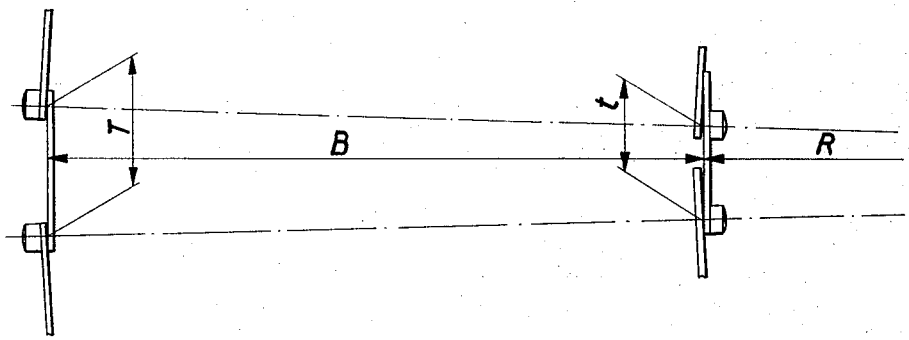
$$L = T - t + d = \frac{t}{R} \cdot B + d$$
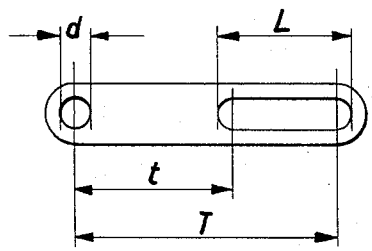
Fig. 6
Inventor:
Jannes Jonge Poerink

United States Patent Office 3,368,662
Patented Feb. 13, 1968

3,368,662
TRANSPORT DEVICE WITH CONVEYOR BELT
GUIDED RECTILINEAR AND CURVILINEAR
Jannes Jonge Poerink, P.O. Box 4, Borne, Netherlands
Filed Nov. 1, 1966, Ser. No. 595,301
Claims priority, application Germany, Nov. 4, 1965,
N 27,576
3 Claims. (Cl. 198—182)

ABSTRACT OF THE DISCLOSURE

A link conveyor belt with lateral rods which can be guided rectilinearly and curvilinearly, having a pair of large sprockets positioned on a common shaft at both the entrance and exit of the curve. The conveyor also includes smaller sprockets mechanically coupled to common shafts of the larger sprockets and located at the exits of the curve adjacent to the inner curve path. The spacing between the teeth of the smaller sprockets corresponds to the spacing between the compressed lateral rod ends along the inner curved path to facilitate the compression of the rod ends as they traverse the curved path.

---

This invention relates to a conveyor apparatus, and in particular to conveyor apparatuses which are designed to have both rectilinear and curvilinear motion.

Conveyor belts of the aforesaid type are presently known and in use. In the known conveyors, arcuately shaped metal link bands are utilized. The known conveyor belts consist substantially of a plurality of transversely arranged linkages, and a plurality of lamellas or thin plates, which are interconnected with the transverse linkage. The thin plates are provided with both circular and oblong or ovate apertures, so that the engagement with the transverse linkages may be readily effected. In this manner, the transverse linkages are movably and slidably mounted within the apertures in the thin plates. The oblong apertures allow one end of the transverse linkages to move towards one another on the inside of the curved portion of the conveyor, while permitting the other ends of the transverse linkages to be moved away from one another.

The drive of the known curvilinear conveyor belts is carried out by the use of round link chains which engage the center of the transverse linkages and drive the entire conveyor belt. Another means of effecting the drive of the known conveyor belts is by the use of geared drive mechanisms.

However, there is need for improvement in the known conveyor apparatus and conveyor belts which have several significant drawbacks. For example, the known conveyor devices do not permit an accurate guiding of the conveyor belt. The transverse linkages are not accurately guided within the curved region of the conveyor, and the positioning of these linkages cannot be controlled. When the curve in a conveyor device is only slight, the positioning of the transverse linkages occurs without difficulty. However, if the radius of the curved region is somewhat larger, the transverse linkages usually do not smoothly follow the inside path of this curve, during the operation of the conveyor device, so that the linkages become jammed. Therefore, the operation of the conveyor belt must be stopped in order to release the linkages from the inside portion of the curve. This frequent stopping of the conveyor apparatus is both irritating and uneconomical.

Accordingly, it is an object of this invention to provide a conveyor apparatus, wherein the conveyor belt is guided with improved precision so that a stoppage of the conveyor belt is substantially impossible.

It is a further object of this invention to provide a drive and a guide means for a conveyor belt, which are arranged so that an accurate guiding of the conveyor belt is assured.

It is yet another object of this invention to provide a conveyor belt, wherein the elements are so arranged and dimensioned, that a radial alignment of the transverse linkages is guaranteed when the linkages move through the curve of the conveyor. In this manner, the linkages do not become tangled within the curved region of the conveyor so that the device will operate without interruption.

In accordance with the above objects, the conveyor device, according to this invention, comprises a curvilinear conveyor belt. The conveyor belt also comprises transverse or cross rods and connecting links for these rods. The connecting links may be in form of lamellas, thin plates or wire linkages each having a round and an oblong or ovate opening provided therein. Furthermore, the conveyor device is provided with means for moving, guiding and controlling the movement of the conveyor belt in the form of guide sprockets. These guide sprockets are mounted on shafts, whereby the guide sprockets having the larger diameters are mounted away from the curve, while the guide sprockets having the smaller diameters are disposed as close as possible to the curve. These guide sprockets are connected with each other by means of transmission means.

This invention will be more clearly understood from the following description of the specific embodiments of the invention, together with the accompanying drawings in which:

FIG. 1 is a plan view of a section of a conveyor belt in accordance with this invention;

FIG. 2 is a side elevation in section view of a section of the conveyor belt of this invention;

FIG. 3 is an elevation of a lamella or thin plate member utilized in this invention;

FIG. 4 is a plan view of one portion of the conveyor apparatus;

FIG. 5 is a side elevation of one portion of the conveyor apparatus; and

FIG. 6 is a schematic representation illustrating certain significant dimensions of the conveyor belt.

Referring to the drawings, and in particular to FIGS. 1–3, the construction of the inventive and novel conveyor apparatus is shown therein. A plurality of transverse or cross rods 1 are connected to each other by means of wire linkages 2 and laminated members or thin plates 3. The wire linkages 2 are bent on their ends in such a manner that a circular opening 7 is formed at one end, and an oblong or longitudinal ovate opening 9 is formed on the other end thereof. Thin plates 3 are similarly formed in that they also have a circular opening 6 at one end and an oblong or longitudinal ovate opening 8 on the other end thereof.

In accordance with one embodiment of the invention, wherein the wire linkages 2 are used, the cross rods 1 alternately engage the opening 9 and the circular opening 7. Spacing springs 4 are arranged under tension between each pair of the wire linkages 2 to maintain the proper distance between the plates 3 and the wire linkages 2. Spacing springs 4 may be replaced by bushings, if so desired. Spacing springs 4 are retained in position by means of limiting rings 5 which are mounted on the ends of cross rods 1. When the conveyor belt is moving through a curved path, cross rods 1 approach each other depending on the radius of the curve, and are displaced farthest apart from each other at the outer radius of the curve.

The cross rods 1 are arranged so as to permit the smallest possible distance between their corresponding ends while traveling through the curve of the conveyor apparatus to insure a radial positioning of the cross rods 1. If this positioning is not achieved, it is possible that the cross rods would tilt while traveling through the curve, which would result in a jamming of the conveyor belt.

According to an important aspect of this invention, the longitudinal dimension of the longitudinal ovate or oblong opening 8 of the thin plate 3, and of the corresponding opening 9 of the wire linkage 2, is defined by the relationship:

$$L = T - t + d = \frac{t}{R} \times B + d$$

The nature of the factors in the above equation will be best understood from an examination of the schematic illustration of FIG. 6 wherein:

$t$=the distance between cross bars at the inner portion of the conveyor belt;
$T$=the corresponding dimension at the outer portion of the belt;
$d$=the diameter of the cross rods 1 and the diameter of the circular opening 6;
$R$=the inner radius of the belt; and
$B$=the width of the conveyor belt.

In order to avoid this jamming, wire linkages 2 or lamellas 3 are dimensioned in accordance with the above formula. When lamellas or wire linkages in accordance with the above formula are used, the ends of the cross rods 1 will be at the smallest possible distance from each other while traveling through the inner radius of the curve, so that a radial positioning automatically results. In this manner, it is not possible for the ends of cross rods 1 to tilt in the guide rails and jam the conveyor apparatus.

The conveyor belt constitutes one essential element of the conveyor apparatus of this invention. Furthermore, drive and guide means for moving and guiding the conveyor belt are required. In FIG. 4 there is shown a portion of a conveyor belt moving in the direction of the arrow. The conveyor belt is driven by a pair of sprocket wheels 10 which are mounted on a shaft 11 driven by conventional drive means (not shown). Cross rods 1 and spacing springs or bushings 4 engage the teeth of sprocket wheels 10, and are pulled thereby.

At the region at which the conveyor belt passes from the curved portion into a rectilinear portion, guide means, which are described in greater detail below, are provided. Two spocket wheels 16 and 17 are mounted at opposite ends of a shaft 18 which extends from beneath inner radius of the curved portion as shown in FIG. 4. Sprocket wheels 16 and 17 correspond exactly in dimension and in number of teeth to sprocket wheel 10. Sprocket wheels 16 and 17 are moved into rotational motion by means of cross rods 1 which engage the teeth of sprocket wheels 16 and 17. As mentioned above, cross rods 1 are moved by drive sprocket wheels 10. On the inner radius of the curve adjacent the end of shaft 18, a further sprocket wheel 19 is provided. Another shaft 21 is arranged parallel to and adjacent shaft 18, closer to the inner radius and a sprocket wheel 22 is mounted for rotation at one end thereof. Sprocket 22 is operatively engaged to sprocket wheel 19 by means of a coupling chain 23.

Beneath the end of shaft 21, a sprocket wheel 20 is arranged (FIGS. 4 and 5), which is smaller in diameter than the sprocket wheel 17 and is located in close proximity thereto. Preferably, sprocket wheel 20 will have the same number of teeth as the sprocket wheel 17. Within its curved portion, the conveyor belt is supported on both sides by means of rails 12 and 13. On the inner radius of the curve, a guiding or limiting rail 14 is provided. Rail 14 will not be required if lamellas 3 or wire linkages 2 are used in accordance with the above formula. A cover rail 15 is provided on the inner radius, so that the conveyor belt will not buckle at that portion of the device. Such a cover rail is not necessary at the outer radius of the conveyor belt.

A further set of sprocket wheels is provided on the conveyor belt which operates in the same manner as the sprocket wheels described above. Cross rods 1 also engage the teeth of sprocket wheels 24 and 25, to produce a rotation of these wheels. Sprocket wheels 24 and 25 transmit this rotational movement over a shaft 31 onto a sprocket wheel 28, which is operatively connected to sprocket wheel 27 by means of a coupling chain 29. Sprocket wheel 27 is mounted on a shorter shaft 32. Underneath the shaft 32, adjacent to the sprocket wheel 25, a smaller sprocket wheel 26 is provided, which preferably should have the same number of teeth as sprocket wheel 25. Sprocket wheels 16 and 17, as well as sprocket wheels 24 and 25, are so dimensioned to enable them to engage the cross rods 1 of the conveyor belt.

If the chain transmisison comprising sprockets 19, 22 and chain 23 and the chain transmission comprising sprockets 27, 28 and chain 29 are connected with each other by means of a gear-chain-transmisison (not shown), the driving pull of the rectilinear portion 30 of the conveyor belt need not be transmitted via the lamellas 3 to the outer portion thereof. In this manner, the portion of the conveyor belt which is in the curve radius is relieved, so that only the articles which are within the curve radius determine the pull which exists in the conveyor belt.

The novel conveyor device according to this invention comprises many advantageous features in view of corresponding conveyors known to the art, because the conveyor belt is guided in such a manner, that no interruptions in the operation will occur, due to the fact that the jamming of cross rods 1 is made substantially impossible. The guiding elements for the conveyor belt are combined in a manner which provides for the correct distance between them, so that the conveyor belt is accurately guided on each portion thereof. Furthermore, the novel conveyor belt provides operating elements which are dimensioned according to the above formula so that a radial positioning of the cross rods 1 in the curve portion of the conveyor is assured.

The advantageous effect of the sprocket wheels, which are arranged on the outset of the curve, is the result of the spacing between the individual teeth of the sprocket wheels, which correspond to the distance between the individual cross rods 1 when a pull is exerted on the conveyor belt during the operation thereof. The spacing between the teeth of the smaller diameter sprocket wheels is less and corresponds to the distance between the ends of the rods 1 which prevails on the inner radius of the curve. Hence, the smaller sprocket wheels arrest the cross rods 1 until they are taken over by the larger sprocket wheels.

The larger diameter sprocket wheels are not only advantageous at the outset of the curve and in combination with the smaller diameter sprocket wheels, but are also of importance on the beginning of the curve. The larger sprocket wheels define the number of cross rods 1 which are introduced into the curves. In this way, the same number of cross rods 1 are always introduced into the curve radius. The large diameter sprocket wheels also press the ends of cross rods 1 together, so that the smallest distance between them is achieved, as indicated above. The embodiment of the invention particularly described above is presented solely for purposes of example. Other embodiments, forms and modifications of the invention, coming within the proper scope of the invention as defined in the appended claims, will of course readily suggest themselves to those skilled in the art.

What is claimed is:

1. Conveyor device having a curvilinear link conveyor belt with lateral rods and connecting links with circular and oblong openings, said rods engaged by a pair of pushing and pulling large sprocket wheels respectively, one of said pair of wheels being positioned on a common shaft located at the entrance of the curve and the other pair at the exit of the curve; said conveyor device comprising smaller sprocket wheels trunnioned on shafts located close to the curve at the entrance and exit of the curve at the inner curve path, adjacent to one of said large sprocket wheels wherein the spacing between the teeth of said smaller sprocket wheels corresponds to the spacing between the compressed lateral rod ends of the conveyor belt along the inner curve path.

2. The conveyor as recited in claim 1 additionally comprising driver sprocket wheels connected to one end of said shafts supporting said large pushing and pulling sprocket wheels, and adjacent to the inner side of the curved path, driven sprocket wheels connected to the ends of said shafts supporting said small sprocket wheels, and transmission means for coupling said driver and driven sprocket wheels together.

3. The conveyor as recited in claim 2 wherein said transmission means comprises drive chains coupled to said sprocket wheels.

References Cited

UNITED STATES PATENTS 2,872,023   2/1959   Bechtel _____ 198—182

FOREIGN PATENTS 532,262   10/1956   Canada.
853,074   11/1960   Great Britain.
515,066   12/1930   Germany.

RICHARD E. AEGERTER, *Primary Examiner.*